United States Patent
Shimizu et al.

(10) Patent No.: US 11,202,485 B2
(45) Date of Patent: Dec. 21, 2021

(54) OUTSOLE STRUCTURE, METHOD FOR PRODUCING THE SAME, AND CLEATED SHOE INCLUDING OUTSOLE STRUCTURE

(71) Applicant: Mizuno Corporation, Osaka (JP)

(72) Inventors: Yuichi Shimizu, Osaka (JP); Tsuyoshi Ieta, Osaka (JP); Takuto Masuda, Osaka (JP)

(73) Assignee: Mizuno Corporation, Osaka (JP)

( * ) Notice: Subject to any disclaimer, the term of this patent is extended or adjusted under 35 U.S.C. 154(b) by 51 days.

(21) Appl. No.: 16/807,878

(22) Filed: Mar. 3, 2020

(65) Prior Publication Data
US 2020/0281306 A1    Sep. 10, 2020

(30) Foreign Application Priority Data
Mar. 4, 2019   (JP) .............................. JP2019-038734

(51) Int. Cl.
*A43C 15/16*   (2006.01)
*A43B 5/18*    (2006.01)
*A43B 5/00*    (2006.01)
*A43C 13/04*   (2006.01)

(52) U.S. Cl.
CPC ................ *A43B 5/185* (2013.01); *A43B 5/00* (2013.01); *A43C 13/04* (2013.01); *A43C 15/16* (2013.01)

(58) Field of Classification Search
CPC .. A43B 5/00; A43B 5/02; A43C 15/16; A43C 13/04
See application file for complete search history.

(56) References Cited

U.S. PATENT DOCUMENTS

| | | | | |
|---|---|---|---|---|
| 4,633,600 A * | 1/1987 | Dassler | ................ | A43C 15/161 36/134 |
| 4,644,672 A * | 2/1987 | Dassler | ................ | A43C 15/161 36/134 |
| 8,322,051 B2 * | 12/2012 | Auger | .................. | A43C 15/168 36/67 R |
| 8,375,604 B2 * | 2/2013 | Eder | ...................... | A43B 13/26 36/134 |
| 8,453,349 B2 * | 6/2013 | Auger | .................. | A43C 15/168 36/59 R |
| 8,720,086 B2 * | 5/2014 | Auger | .................... | A43B 7/085 36/134 |
| 2005/0016029 A1 * | 1/2005 | Auger | .................. | A43B 13/026 36/134 |

(Continued)

FOREIGN PATENT DOCUMENTS

JP         2016168843 A     9/2016

*Primary Examiner* — Marie D Bays
(74) *Attorney, Agent, or Firm* — Troutman Pepper Hamilton Sanders LLP; James E. Schutz; Micah B. Hensley

(57) ABSTRACT

A stud of an outsole structure includes: a tubular body having a ground contact portion that comes into contact with ground, and a hole passing through the stud upward from the ground contact portion; a core disposed inside the hole and extending vertically; and a plurality of partition walls disposed above the ground contact portion and extending radially from the core toward an inner wall surface of the tubular body. An outsole body has a plurality of locking portions disposed below the partition walls. Each of the locking portions is locked to an associated one of the partition walls in a state in which an upper end portion of the locking portion is in contact with a lower end portion of the associated partition wall.

15 Claims, 10 Drawing Sheets

(56) References Cited

U.S. PATENT DOCUMENTS

| | | | |
|---|---|---|---|
| 2007/0277399 A1* | 12/2007 | Dow | A43C 13/04 |
| | | | 36/134 |
| 2008/0216362 A1* | 9/2008 | Gerber | A43B 13/141 |
| | | | 36/67 A |
| 2009/0293315 A1* | 12/2009 | Auger | A43C 15/167 |
| | | | 36/114 |
| 2012/0210608 A1* | 8/2012 | Baker | A43C 15/161 |
| | | | 36/134 |
| 2013/0318831 A1* | 12/2013 | Foxen | A43B 5/06 |
| | | | 36/25 R |
| 2013/0340295 A1* | 12/2013 | Adami | A43B 13/16 |
| | | | 36/25 R |
| 2016/0262494 A1 | 9/2016 | Weidl | |

* cited by examiner

FIG.1
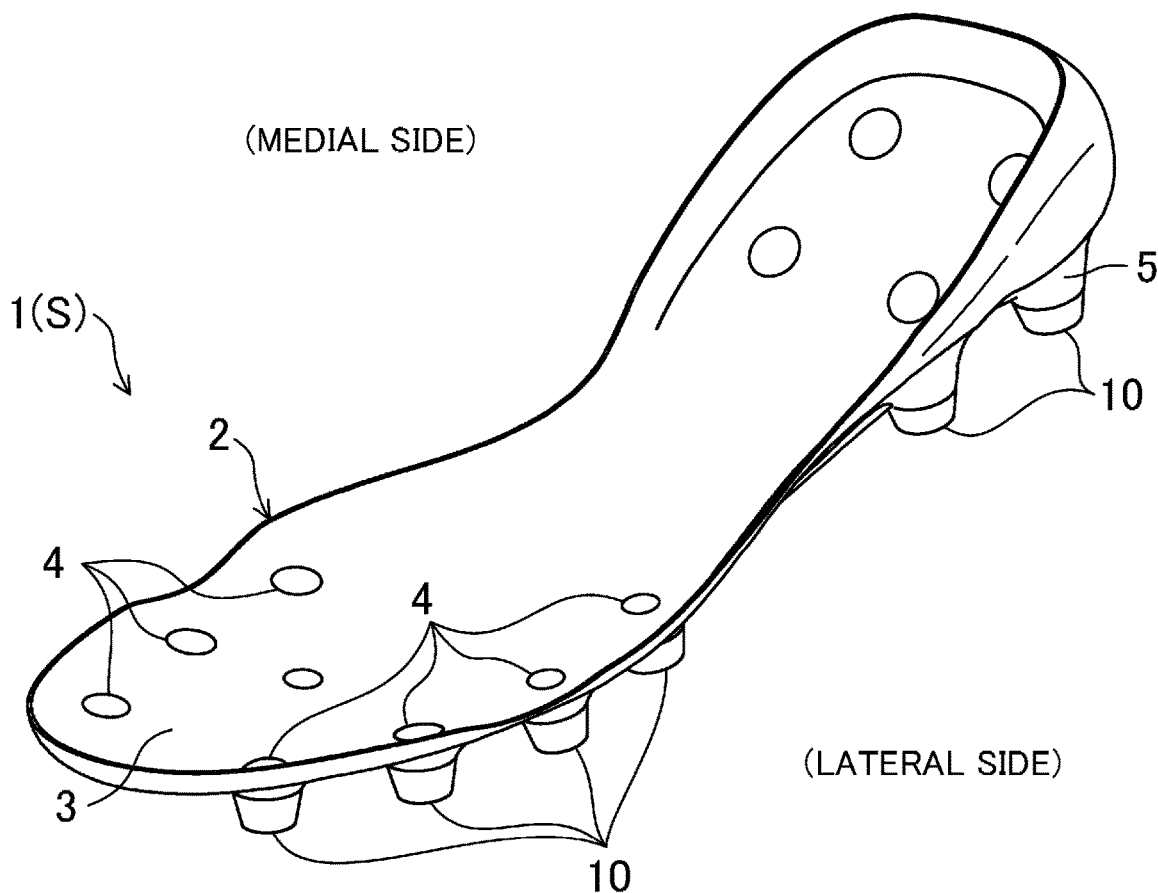
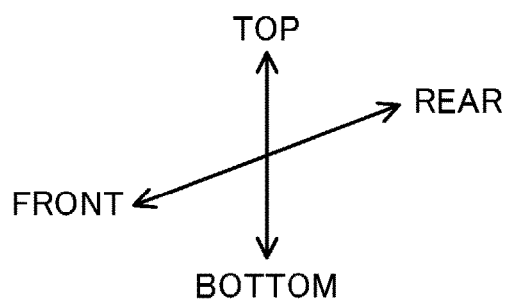

OUTSOLE STRUCTURE, METHOD FOR PRODUCING THE SAME, AND CLEATED SHOE INCLUDING OUTSOLE STRUCTURE

CROSS-REFERENCE TO RELATED APPLICATION

This application claims priority to Japanese Patent Application No. 2019-038734 filed on Mar. 4, 2019, the entire disclosure of which is incorporated by reference herein.

BACKGROUND

The present disclosure relates to an outsole structure, a method for producing the same, and a cleated shoe including an outsole structure.

An outsole structure for a shoe with a plurality of studs as disclosed in Japanese Unexamined Patent Publication No. 2016-168843, for example, has been known.

Japanese Unexamined Patent Publication No. 2016-168843 discloses an outsole structure including an outsole body (an outsole element) and studs. Each of the studs has a ground contact surface having a lower end portion that comes into contact with ground, and an opening passing therethrough upward from the ground contact surface. The outsole body has projections projecting downward and inserted into, and run through, the respective openings. In the outsole structure of Japanese Unexamined Patent Publication No. 2016-168843, the outsole body and the studs are integrated together by injection of a constituent material for the outsole body through the openings of the studs.

SUMMARY

In the outsole structure of Japanese Unexamined Patent Publication No. 2016-168843, the openings are each formed so that the distance between portions of an inner wall surface of the opening facing each other as viewed in cross section continuously decreases from an upper end of the associated stud toward the associated ground contact surface. On the other hand, the projections each have a cross-sectional shape tapered downward from a lower surface of the outsole body along the inner wall surface of the associated opening, and are each fitted into the associated opening (see FIG. 2 of Japanese Unexamined Patent Publication No. 2016-168843). In other words, the projections are each held in the associated stud by only the adhesion at the interface between the protrusion and the inner wall surface of the associated opening.

If, for example, the outsole body and the studs in the outsole structure of Japanese Unexamined Patent Publication No. 2016-168843 are integrated together by the injection of the same material as that for the studs as a constituent material for the outsole body into the openings, and the adhesion at the interfaces between the outsole body and the studs is low, the above-described shape of the projections may cause the studs to be separated from the outsole body. In particular, if, for example, the studs are deeply embedded in the ground when the shoe touches the ground (hereinafter referred to as "at the time of touching the ground"), the above-described shape of the projections causes the studs to be easily separated from the outsole body. As can be seen, the outsole structure of Japanese Unexamined Patent Publication No. 2016-168843 cannot sufficiently reduce the separation of the studs from the outsole body.

In view of the foregoing background, it is therefore an object of the present disclosure to reduce the separation of studs from an outsole body.

To achieve the above object, a first aspect of the present disclosure is directed to an outsole structure for a shoe. The outsole structure includes: an outsole body; and a stud integrated with the outsole body. The stud includes: a tubular body having a ground contact portion that comes into contact with ground, and a hole passing through the stud upward from the ground contact portion; a core disposed inside the hole and extending vertically; and a partition wall disposed above the ground contact portion and extending radially from the core toward an inner wall surface of the tubular body. The outsole body has a locking portion disposed below the partition wall. The locking portion is locked to the partition wall in a state in which an upper end portion of the locking portion is in contact with a lower end portion of the partition wall.

According to the first aspect, the locking portion is locked to the partition wall in a state in which the upper end portion of the locking portion is in contact with the lower end portion of the partition wall. In the state in which the locking portion is locked to the associated partition wall, the stud is physically held on the outsole body in the hole of the tubular body. Thus, even if, for example, adhesion at the interfaces between the outsole body and the stud is reduced in the case in which the outsole body and the stud are integrated together by injecting, as a constituent material for the outsole body, the same material as that for the stud into the hole, the stud is prevented from being easily separated from the outsole body because the stud is physically held on the outsole body in the hole of the tubular body. In particular, even if, for example, the stud is deeply embedded in the ground when the shoe touches the ground (hereinafter referred to as "at the time of touching the ground"), the stud is less likely to be separated from the outsole body because the stud is physically held on the outsole body. This configuration of the first aspect can reduce the separation of the stud from the outsole body.

A second aspect of the present disclosure is an embodiment of the first aspect. In the second aspect, the partition wall includes at least one first partition wall extending vertically. The at least one first partition wall is continuous with the core and the tubular body, and has a lower end portion positioned above the ground contact portion. The locking portion includes at least one first locking portion having an upper end portion in contact with the lower end portion of the at least one first partition wall.

According to the second aspect, the first locking portion is locked to the first partition wall toward the ground contact portion of the tubular body. In the state in which the at least one first locking portion is locked to the associated first partition wall, the stud is physically held on the outsole body in the hole near the ground contact portion. As a result, the stud is less likely to be easily separated from the outsole body. In particular, even if the stud is deeply embedded in the ground at the time of touching the ground and caught on a foreign object in the ground, the stud is less likely to be separated from the outsole body because the stud is held on the outsole body near the ground contact portion of the tubular body. This configuration of the second aspect can reduce the separation of the stud from the outsole body.

A third aspect of the present disclosure is an embodiment of the first aspect. In the third aspect, the partition wall includes at least one second partition wall disposed near an upper portion of the core and extending from the core in a direction intersecting with the core, and the locking portion includes at least one second locking portion having an upper end portion in contact with a lower portion of the at least one second partition wall.

According to the third aspect, the second locking portion is locked to the second partition wall near an upper portion of the tubular body. In the state in which the at least one second locking portion is locked to the associated second partition wall, the stud is physically held on the outsole body near the upper portion of the core (i.e., near the upper portion of the tubular body). As a result, the stud is less likely to be easily separated from the outsole body. In particular, in a state in which at least one first locking portion is locked to the associated first partition wall, and at least one each second locking portion is locked to the associated second partition wall, the stud is firmly held on the outsole body both near the ground contact portion of the tubular body and near the upper portion of the tubular body. This configuration of the third aspect can further reduce the separation of the stud from the outsole body.

A fourth aspect of the present disclosure is an embodiment of the second aspect. In the fourth aspect, the least one first partition wall includes a plurality of first partition walls. The plurality of first partition walls are spaced apart from each other in a circumferential direction of the tubular body. The partition wall includes at least one second partition wall disposed near an upper portion of the core and extending from the core in a direction intersecting with the core. The locking portion includes at least one second locking portion having an upper end portion in contact with a lower portion of the at least one second partition wall. The at least one second partition wall is disposed between two of the at least one first partition walls adjacent to each other in the circumferential direction.

According to the fourth aspect, the at least one second partition wall is disposed between two of the at least one first partition walls adjacent to each other in the circumferential direction. Specifically, the locked state of the first partition wall by the first locking portion and the locked state of the second partition wall by the second locking portion can be alternately arranged in the circumferential direction of the tubular body. This configuration substantially prevents the unbalanced arrangements of the locked state between the partition walls and the locking portions in the circumferential direction of the tubular body as a whole. This configuration of the fourth aspect can further reduce the separation of the stud from the outsole body.

A fifth aspect of the present disclosure is an embodiment of the third aspect. In the fifth aspect, the at least one second partition wall extends in a direction inclined downward from the upper portion of the core.

According to the fifth aspect, the at least one second partition wall extends in a direction inclined downward from the upper portion of the core. Specifically, the second partition wall is inclined in a direction opposite to the direction in which when affected by an external force, the associated stud is about to be separated from the outsole body. Such a configuration allows the second partition wall to act like a barb on a fishing hook, for example, thus more firmly locking the second locking portion to the second partition wall. This configuration can further reduce the separation of the stud from the outsole body.

A sixth aspect of the present disclosure is an embodiment of the first aspect. In the sixth aspect, the tubular body includes a first bulging portion formed such that an intermediate portion of an inner wall surface of the tubular body bulges toward the core, and the outsole body has a first recess positioned to correspond to the first bulging portion and formed in a shape of a depression to conform to an outer shape of the first bulging portion.

According to the sixth aspect, the first recess of the outsole body is fitted to the first bulging portion. In this state, the stud is held on the outsole body. This configuration can further reduce the separation of the stud from the outsole body in combination with the locked state between the partition wall and the locking portion.

A seventh aspect of the present disclosure is an embodiment of the first aspect. In the seventh aspect, the core includes a second bulging portion formed such that an intermediate portion of the core bulges toward an inner wall surface of the tubular body, and the outsole body has a second recess positioned to correspond to the second bulging portion and formed in a shape of a depression to conform to an outer shape of the second bulging portion.

According to the seventh aspect, the second recess of the outsole body is fitted to the second bulging portion. In this state, the stud is held on the outsole body. This configuration can further reduce the separation of the stud from the outsole body in combination with the locked state between the partition wall and the locking portion.

An eighth aspect of the present disclosure is directed to a method for producing the outsole structure of the first aspect. This method includes integrating the outsole body and the stud together by injection molding.

The eighth aspect can provide the outsole structure with reduced possibility of separation of the stud from the outsole body in a stable manner.

A ninth aspect of the present disclosure is directed to a cleated shoe including the outsole structure of any one of the first to eighth aspects.

According to the ninth aspect, the stud integrated with the outsole body can increase the grip of the shoe on the ground and increase the stability of the shoe at the time of touching the ground.

Advantages of the Invention

As described above, the present disclosure can reduce the separation of a stud from an outsole body.

BRIEF DESCRIPTION OF THE DRAWINGS

FIG. 1 is a perspective view illustrating an outsole structure according to an embodiment of the present disclosure.

DETAILED DESCRIPTION

Figure 2:
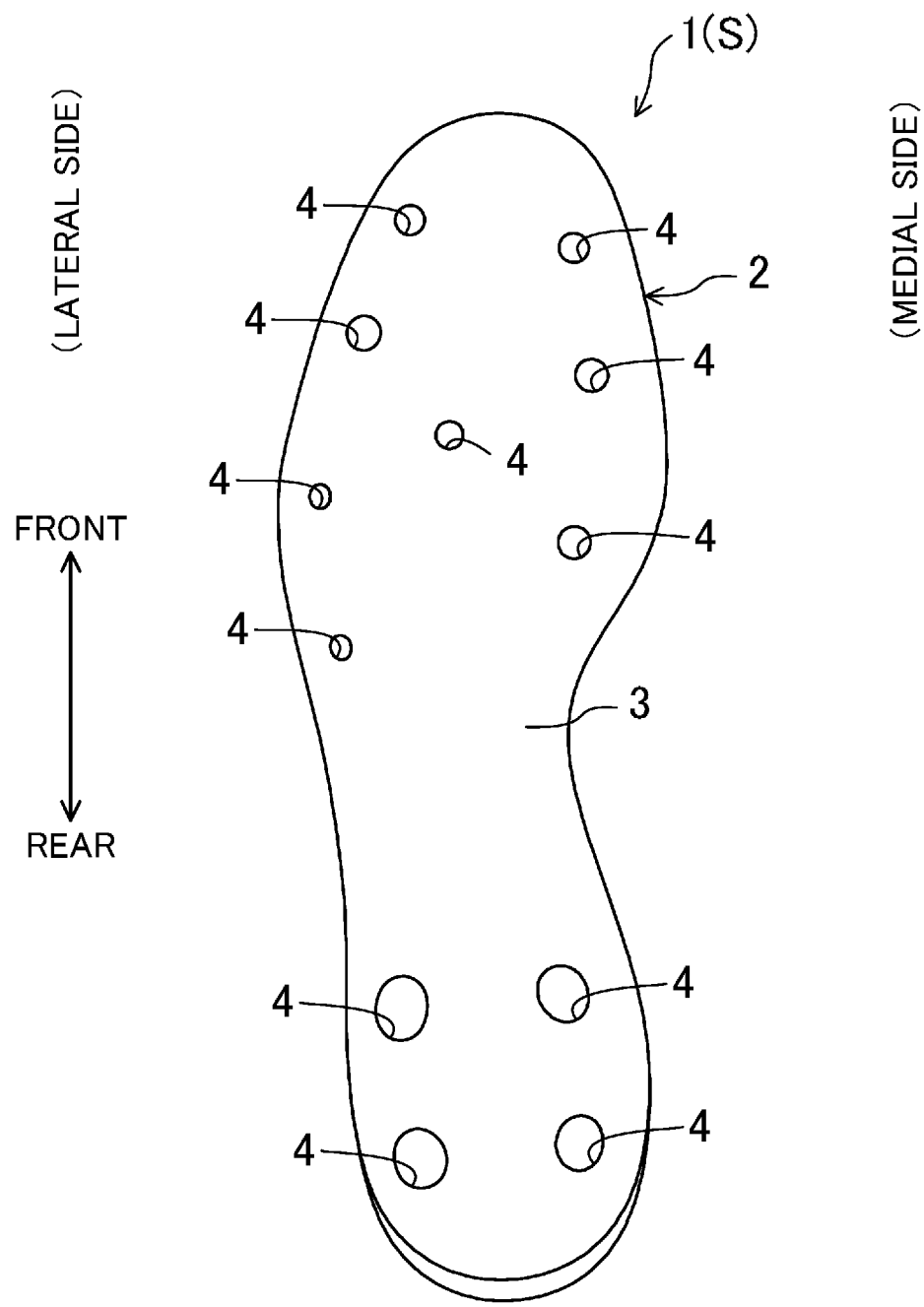
FIG. 2 is a plan view illustrating the outsole structure.

An embodiment of the present disclosure will now be described in detail with reference to the drawings. Note that the following description of the embodiment is merely an example in nature, and is not intended to limit the scope, applications, or use of the present disclosure.

FIGS. 1 to 4 show an outsole structure 1 according to an embodiment of the present disclosure and a shoe S including the outsole structure 1. A pair of shoes S may be used, for example, as cleated shoes for use in sports requiring explosive actions, such as soccer, rugby, American football, and baseball.

The drawings illustrate a left shoe S only as an example. The right shoe is symmetrical to the left shoe. Only the left shoe will be described in the following description, and the description of the right shoe will be omitted herein.

In the following description, the expressions "above," "upward," "on a/the top of," "below," "under," and "downward," represent the vertical positional relationship between respective components of the shoe S. The expressions "front," "fore," "forward," "anterior," "rear," "hind," "behind," "backward," and "posterior" represent the positional relationship in the longitudinal direction between respective components of the shoe S. The expressions "medial side" and "lateral side" represent the positional relationship in the foot width direction between respective components of the shoe S (see arrows shown in FIGS. 1 to 4).

Further, a side of a stud 10, described below, on which second partition walls 22, 22, . . . , described below, are located is defined as the upper side of the stud 10, and a side of the stud 10 on which a ground contact portion 12, described below, is located is defined as the lower side of the stud 10. In this manner, the vertical positional relationship between respective components of the stud 10 is determined (see arrows shown in FIGS. 5 to 9).

(Outsole Body)

As shown in FIGS. 1 to 4, the outsole structure 1 has an outsole body 2. The outsole body 2 is made, for example, of a relatively hard resin material, such as nylon-based elastomer, or a resin material having high resistance to wear, such as thermoplastic polyurethane. The outsole body 2 has a shape of a thin plate. An upper (not shown) is fixed to a peripheral portion of the outsole body 2.

An upper surface of the outsole body 2 is configured as a planta support surface 3 which is configured to support a wearer's planta. The planta support surface 3 has round holes 4, 4, . . . , passing therethrough downward in a vertical direction. Each round hole 4 has a substantially circular shape in a plan view. The round hole 4 is located at a position corresponding to a core 15 of an associated one of studs 10, described below, in the vertical direction.

As shown in FIG. 1, the outsole body 2 includes base portions 5, 5, . . . . As shown also in FIGS. 3 and 4, each of the base portions 5 is configured as a portion of the outsole body 2. The base portion 5 protrudes downward from the outsole body 2 in the vertical direction. The base portion 5 is formed to extend over a predetermined region including at least one of the studs 10, described below, and its surrounding area, as viewed from the bottom.

(Stud)

Next, as shown in FIG. 1, the outsole structure 1 includes the studs 10, 10, . . . . The studs 10, 10, . . . , are used to increase the grip of the shoe S on the ground at the time of touching the ground. The studs 10 are made of, for example, the same resin material as the outsole body 2. The studs 10 are integrated with the outsole body 2 by injection molding. The studs 10 may be made of a resin material different from that of the outsole body 2.

Figure 3:
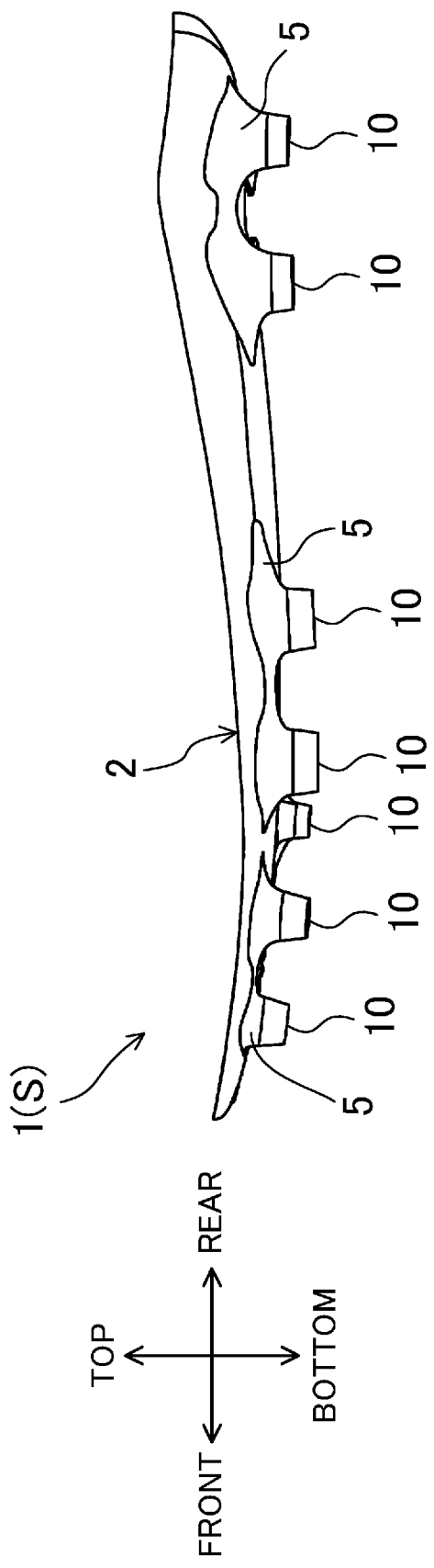
FIG. 3 is a side view of the outsole structure, as viewed from a lateral side thereof.
Figure 4:
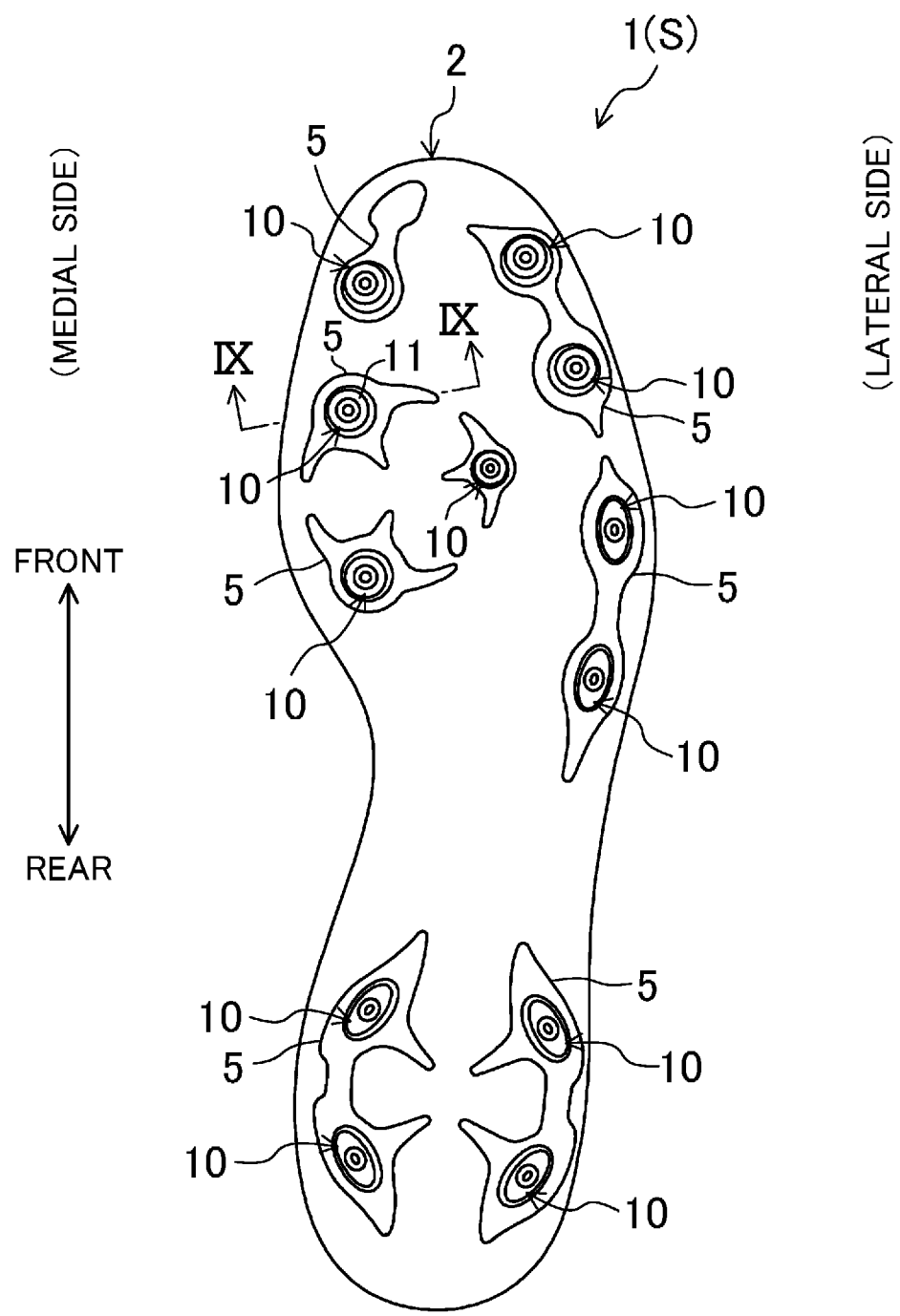
FIG. 4 is a bottom view illustrating the outsole structure.
Figure 5:
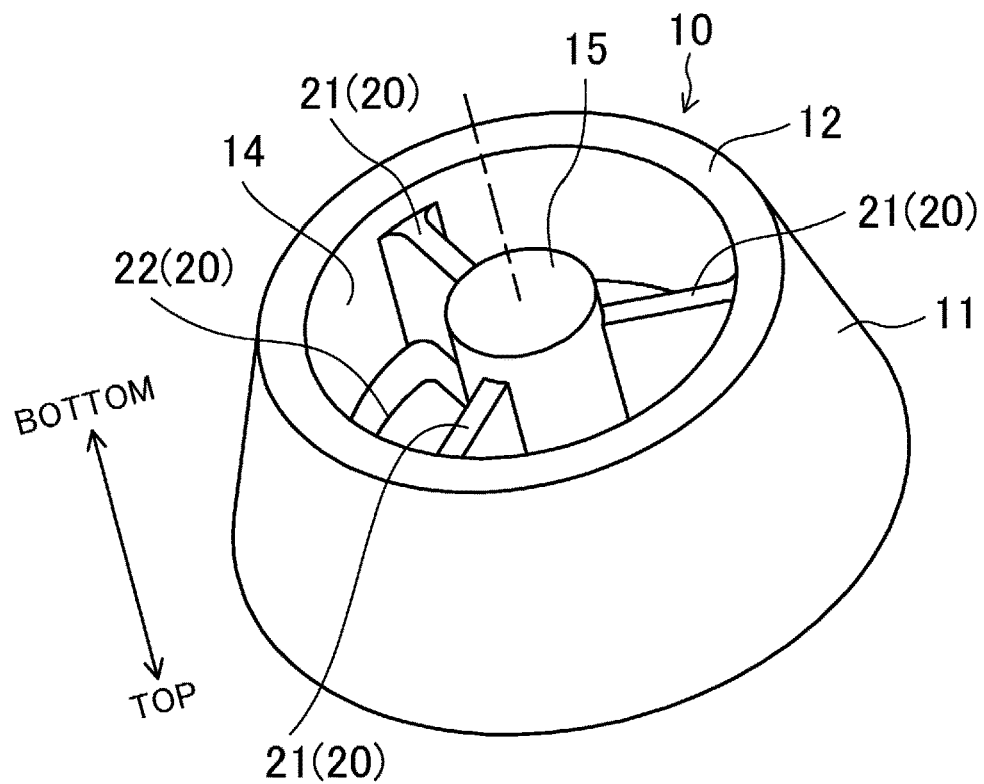
FIG. 5 is a perspective view of a configuration of a stud, as viewed from below.
Figure 6:
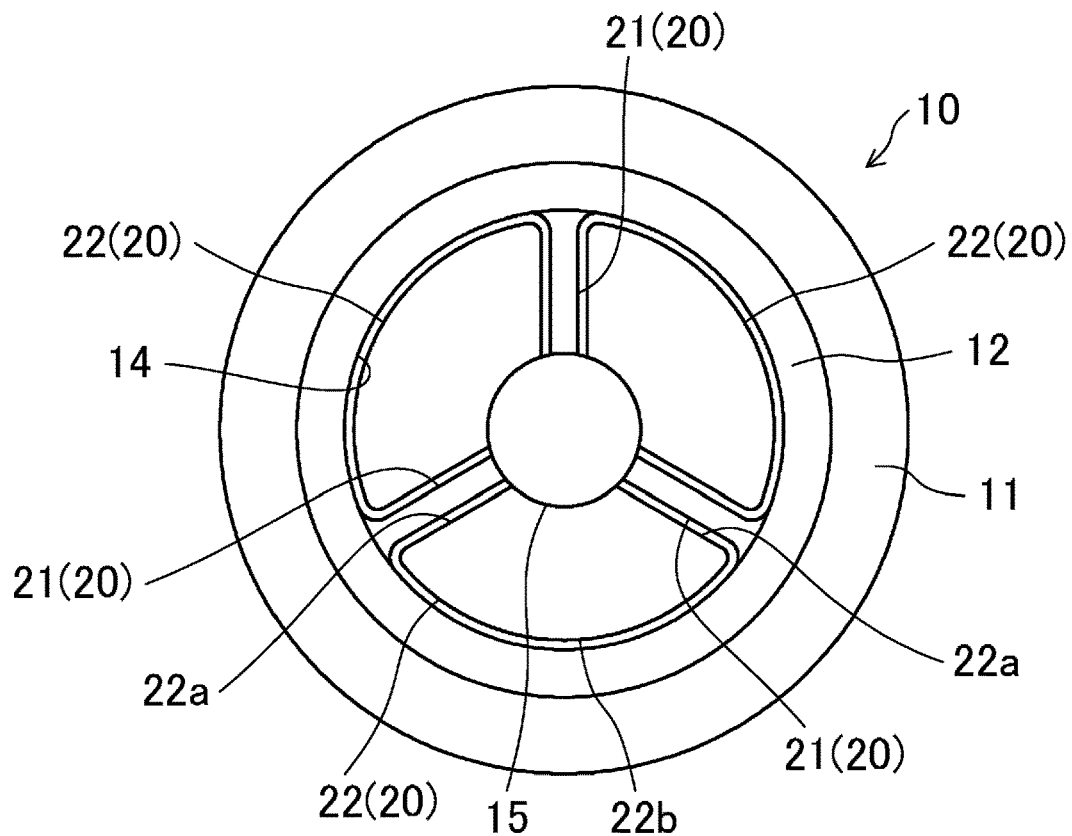
FIG. 6 is a bottom view illustrating the configuration of the stud.
Figure 9:
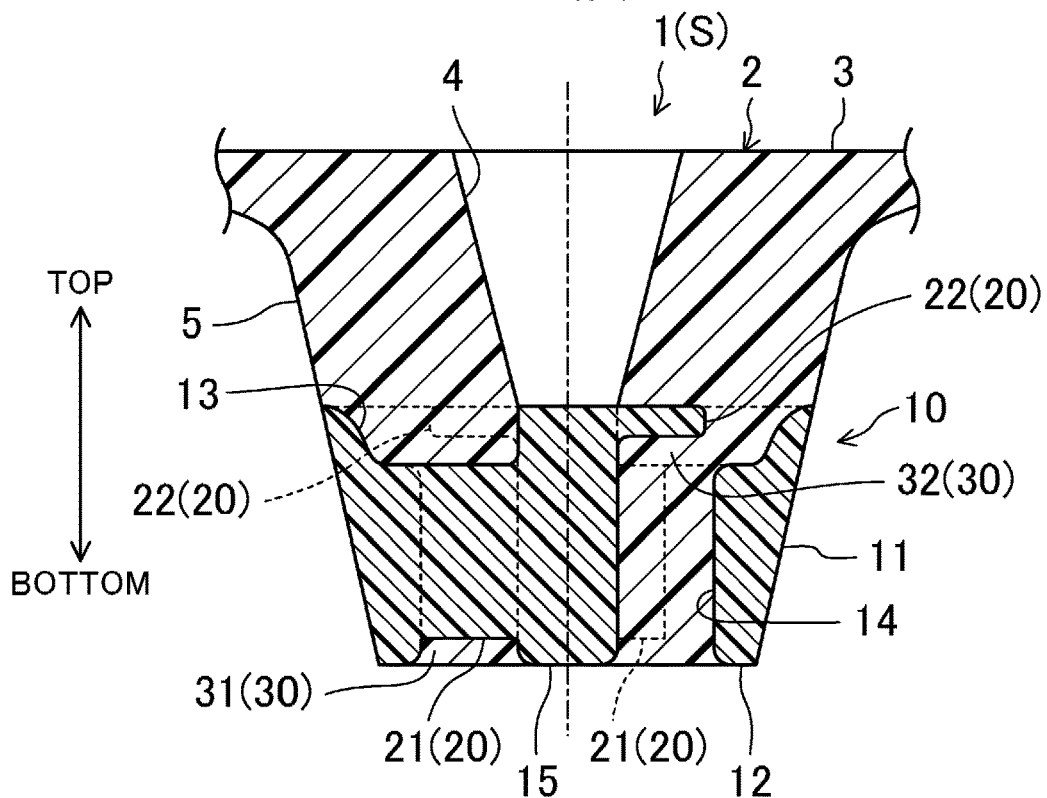
FIG. 9 is an enlarged cross-sectional view taken along line IX-IX shown in FIG. 4.

As shown also in FIGS. 3 and 4, the studs 10, 10, . . . , are arranged so as to be dispersed in a lower surface of the outsole body 2. As shown in FIG. 9, each stud 10 is positioned to overlap with an associated one of the round holes 4 of the outsole body 2 in the vertical direction. The studs 10, 10, . . . , located on each of medial and lateral sides of the outsole structure 1 are spaced apart from each other in a longitudinal direction of the outsole structure 1.

As shown in FIGS. 5 to 9, each stud 10 has a tubular body 11. The tubular body 11 has a cylindrical or elliptic cylindrical shape extending vertically and tapered downward (see FIGS. 3 and 4). The tubular body 11 includes a ground contact portion 12, an upper opening 13, and a hole 14.

The ground contact portion 12 corresponds to a lower end portion of the tubular body 11 and is configured as a portion of the stud 10 that comes into contact with the ground.

The upper opening 13 is positioned to correspond to an upper portion of the tubular body 11 and opens upward. The upper opening 13 is formed through the upper portion of the tubular body 11 such that the distance between portions of an inner wall surface of the tubular body 11 facing each other in a radial direction of the tubular body 11 (hereinafter referred to as the "radial direction") decreases downward.

The hole 14 passes through the tubular body 11 vertically from the ground contact portion 12 toward the upper opening 13. In this embodiment, the hole 14 is formed such that the distance between the portions of the inner wall surface of the tubular body 11 in the radial direction is substantially constant.

Each stud 10 has the core 15. The core 15 is disposed inside the hole 14. Specifically, the core 15 extends along the vertical direction and is positioned inside the hole 14 so as to correspond to substantially the center of the tubular body 11.

The core 15 is substantially cylindrical, for example. The core 15 has a diameter of, for example, about 4.0 mm in one preferred embodiment. The core 15 has a lower end portion substantially flush with the ground contact portion 12 of the tubular body 11 in one preferred embodiment.

(Partition Wall)

As shown in FIGS. 5 to 9, the studs 10 each include partition walls 20, 20, . . . . The partition walls 20, 20, . . . , are disposed above the ground contact portion 12 and extend radially from the core 15 toward the inner wall surface of the tubular body 11 (i.e., outward in the radial direction of the tubular body 11).

The partition walls 20, 20, . . . , include a first partition wall 21, 21, . . . , and a second partition wall 22, 22, . . . .

The first partition wall 21, 21, . . . , includes a plurality of (in the illustrated example, three) first partition walls. The first partition walls 21, 21, . . . , are spaced apart from each other in the circumferential direction of the tubular body 11 (hereinafter referred to as the "circumferential direction"). In this embodiment, the first partition walls 21, 21, . . . , are arranged at equal intervals in the circumferential direction.

Each of the first partition walls 21 is formed in the shape of a plate having a small thickness in the circumferential direction. Specifically, in one preferred embodiment, the first partition walls 21 each have a thickness of, for example, about 1.5 mm in the circumferential direction.

The first partition walls 21 extend vertically. The first partition walls 21 are integrated with, and continuous with, both of the tubular body 11 and the core 15. Specifically, each of the first partition walls 21 has a radially outer end portion that is continuous with the inner wall surface of the tubular body 11, and a radially inner end portion that is continuous with the core 15.

A lower end portion of each first partition wall 21 is positioned above the ground contact portion 12 of the tubular body 11 and the lower end portion of the core 15. In this embodiment, the vertical distances between the ground contact portion 12 and the lower end portion of the core 15 and the lower end portions of the first partition walls 21 are each substantially equal to the vertical thickness of the second partition walls 22.

An upper end portion of each first partition wall portion 21 is positioned below an upper end portion of the tubular body 11 and an upper end portion of the core 15. The upper end portion of each first partition wall 21 is positioned below the second partition walls 22. In this embodiment, the upper end portion of each first partition wall 21 corresponds to the boundary between the upper opening 13 and the hole 14 in the vertical direction. However, this positional relationship is merely a non-limiting example.

The second partition wall 22, 22, . . . , includes a plurality of (in the illustrated example, three) second partition walls. The second partition walls 22, 22, . . . , are arranged at equal intervals in the circumferential direction. The second partition walls 22 are located near an upper portion of the core 15. Specifically, the second partition walls 22 are integrated with the upper end portion of the core 15.

Each of the second partition walls 22 is, for example, substantially sector-shaped, as viewed from above and the bottom. Each of the second partition walls 22 is disposed between two adjacent ones of the first partition walls 21, 21 (see FIG. 6). Peripheral portions 22a of the second partition walls 22 in the circumferential direction and the first partition walls 21 respectively facing the peripheral portions 22a are slightly spaced apart from each other in the circumferential direction. Radially outer peripheral portions 22b of the second partition walls 22 and the inner wall surface of the tubular body 11 facing the peripheral portions 22b are slightly spaced apart from each other in the radial direction.

Figure 7:
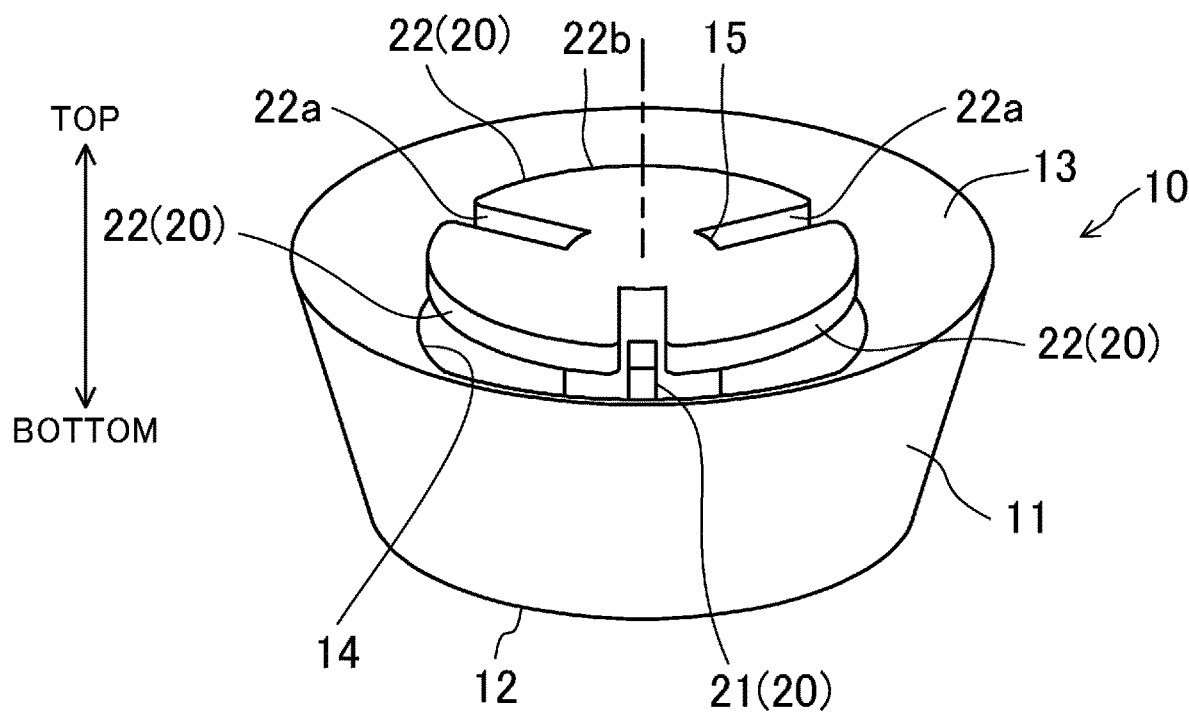
FIG. 7 is a perspective view illustrating the configuration of the stud, as viewed from above.
Figure 8:
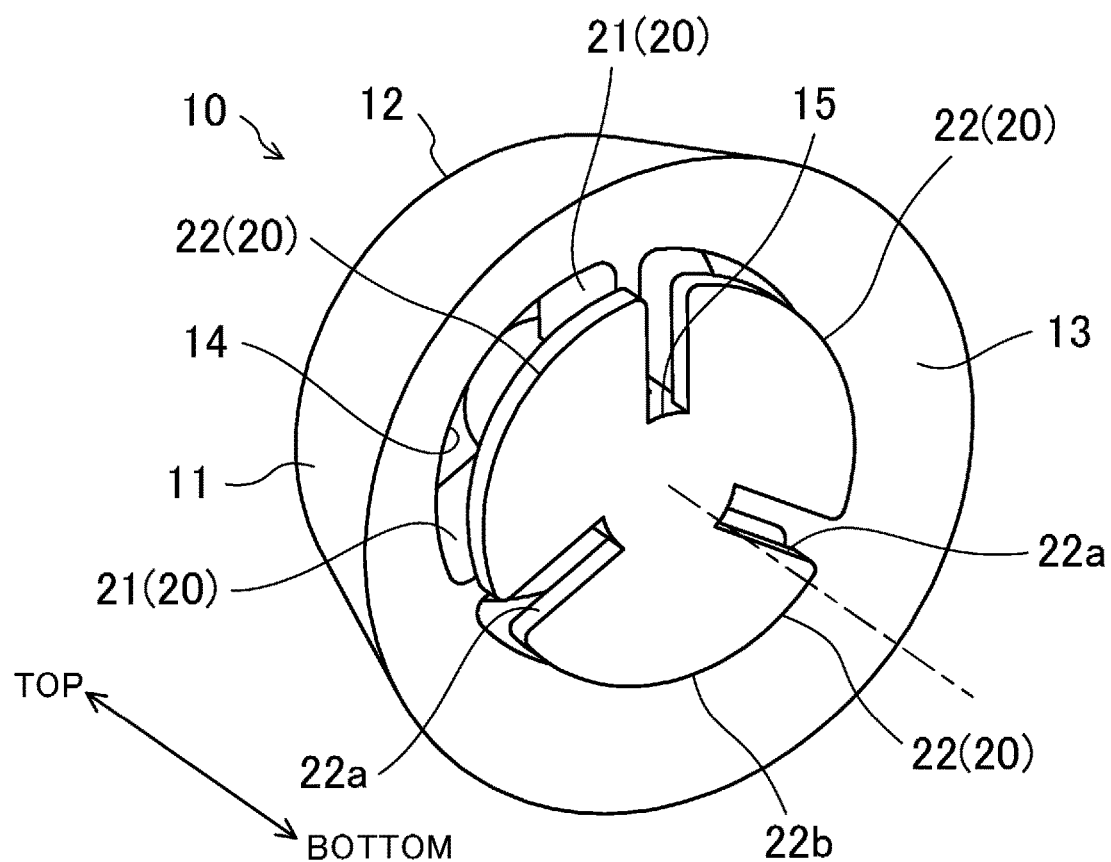
FIG. 8 is a perspective view illustrating the configuration of the stud, as viewed from below.

Each of the second partition walls 22 is formed in the shape of a plate having a small thickness in the vertical direction (see FIGS. 7 to 9). Specifically, in one preferred embodiment, the second partition walls 22 each have a thickness of, for example, about 1.5 mm in the vertical direction.

The second partition walls 22 extend from the upper portion of the core 15 in a direction intersecting with the axial direction of the core 15. Specifically, the second partition walls 22 in this embodiment extend from the upper end portion of the core 15 in a direction orthogonal to the axial direction of the core 15 (i.e., in the radial direction of the tubular body 11).

(Locking Portion)

As shown in FIG. 9, the outsole body 2 has locking portions 30, 30, . . . . The locking portions 30, 30, . . . , are disposed below the partition walls 20, 20, . . . . Each of the locking portions 30, 30, . . . , is locked to an associated one of the partition walls 20, 20, . . . , in a state in which the upper end portion of the locking portion 30 is in contact with the lower end portion of the partition wall 20.

The locking portions 30, 30, . . . , include first locking portions 31, 31, . . . , and second locking portions 32, 32, . . . .

Each of the first locking portions 31 has an upper end portion in contact with the lower end portion of the associated first partition wall 21. That is, the first locking portion 31 is configured to hold the outsole body 2 on the stud 10 near the ground contact portion 12 of the tubular body 11. In this embodiment, the first locking portion 31 has a vertical thickness substantially equal to the vertical thickness of each of the second partition walls 22.

The first locking portions 31 are integrated with, and continuous with, the second locking portions 32, 32 adjacent to each other in the circumferential direction. The lower surfaces of the first locking portions 31 are flush with the ground contact portion 12 and the lower end portion of the core 15. Note that the lower surfaces of the first locking portions 31 do not have to be flush with the ground contact portion 12 and the lower end portion of the core 15.

Each of the second locking portions 32 has an upper end portion in contact with the lower surface of the associated second partition wall 22. That is, the second locking portion 32 is configured to hold the outsole body 2 on the stud 10 near the upper portion of the tubular body 11.

Each of the second locking portions 32 is disposed between two adjacent ones of the first partition walls 21, 21 in the circumferential direction. The lower surfaces of the second locking portions 32 are flush with the ground contact portion 12 and the lower end portion of the core 15. Note that the lower surfaces of the second locking portions 32 do not have to be flush with the ground contact portion 12 and the lower end portion of the core 15.

(Method for Producing Outsole Structure)

Next, a method for producing the outsole structure 1 will be described. This method mainly includes inserting and molding.

First, in the inserting, each of the studs 10 is placed at a predetermined position in a mold apparatus (not shown).

In the molding, after the inserting, the mold apparatus is filled, using an injection molder (not shown), with a resin material (i.e., the resin material to form the outsole body 2) that has been heated to melt. In this case, the resin material is injected from the upper side of each stud 10 placed in the mold apparatus through a gate (not shown) of the mold apparatus toward the hole 14.

After the mold apparatus is filled with the resin material, the mold apparatus undergoes a predetermined cooling treatment. The outsole structure 1 including the integrally-formed outsole body 2 and studs 10, 10, . . . , is obtained by this cooling treatment.

Here, in one preferred embodiment, the mold apparatus has an air vent mechanism (not shown) disposed near a lower end of the hole 14 of each stud 10 placed in the mold apparatus in the inserting. Thus, air staying in a molding chamber of the mold apparatus is discharged to the outside of the mold apparatus through the hole 14 of the stud 10 during the molding. This allows the resin material to smoothly flow from the upper end to the lower end of the hole 14. In other words, the outsole body 2 and the studs 10, 10, . . . , can be easily integrated together.

Advantages of Embodiment

In this embodiment, each locking portion 30 of the outsole body 2 is locked to an associated one of the partition walls 20 in a state in which the upper end portion of the locking portion 30 is in contact with the lower end portion of the partition wall. In the state in which each of the locking portions 30 is locked to the associated partition wall 20, the stud 10 is physically held on the outsole body 2 in the hole 14 of the tubular body 11. Thus, even if, for example, adhesion at the interfaces between the outsole body 2 and the studs 10 is reduced in the case in which the outsole body 2 and the studs 10 are integrated together by injecting, as a constituent material for the outsole body 2, the same material as that for the studs 10 into the holes 14, the studs 10 are prevented from being easily separated from the outsole body 2 because the studs 10 are physically held on the outsole body 2 in the respective holes 14. In particular, even if, for example, the studs 10 are deeply embedded in the ground when the shoe S touches the ground (hereinafter referred to as "at the time of touching the ground"), the studs 10 are less likely to be separated from the outsole body 2 because the studs 10 are physically held on the outsole body 2. This configuration of the outsole structure 1 is capable of reducing the separation of the studs 10 from the outsole body 2.

In the outsole structure 1, each first locking portion 31 is locked to the associated first partition wall 21 toward the ground contact portion 12. In the state in which each of the first locking portions 31 is locked to the associated first partition wall 21, the stud 10 is physically held on the outsole body 2 in the hole 14 near the ground contact portion 12. As a result, the studs 10 are less likely to be easily separated from the outsole body 2. In particular, even if the studs 10 are deeply embedded in the ground at the time of touching the ground and caught on a foreign object in the ground, the studs 10 are less likely to be separated from the outsole body 2 because the studs 10 are held on the outsole body 2 near the ground contact portion 12. This configuration of the outsole structure 1 can reduce the separation of the studs 10 from the outsole body 2.

In the outsole structure 1, each second locking portion 32 is locked to the associated second partition wall 22 near the upper portion of the tubular body 11. In the state in which each of the second locking portions 32 is locked to the associated second partition wall 22, the stud 10 is physically held on the outsole body 2 near the upper portion of the core 15 (i.e., near the upper portion of the tubular body 11). As a result, the studs 10 are less likely to be easily separated from the outsole body 2. In particular, in a state in which each first locking portion 31 is locked to the associated first partition wall 21, and each second locking portion 32 is locked to the associated second partition wall 22 as in the present embodiment, the stud 10 is firmly held on the outsole body 2 both near the ground contact portion 12 and near the upper portion of the tubular body 11. This configuration of the outsole structure 1 can further reduce the separation of the studs 10 from the outsole body 2.

Each of the second partition walls 22 is disposed between two adjacent ones of the first partition walls 21, 21 in the circumferential direction. Specifically, the locked state of the first partition wall 21 by the first locking portion 31 and the locked state of the second partition wall 22 by the second locking portion 32 can be alternately arranged in the circumferential direction of the tubular body 11. This configuration substantially prevents the unbalanced arrangements of the locked state between the partition walls 20 and the locking portions 30 in the circumferential direction of the tubular body 11 as a whole. This configuration can further reduce the separation of the studs 10 from the outsole body 2 of the outsole structure 1.

The outsole body 2 and the studs 10 integrated together by injection molding can provide the outsole structure 1 with reduced possibility of separation of the studs 10 from the outsole body 2 in a stable manner.

First Variation of Embodiment

Figure 10:
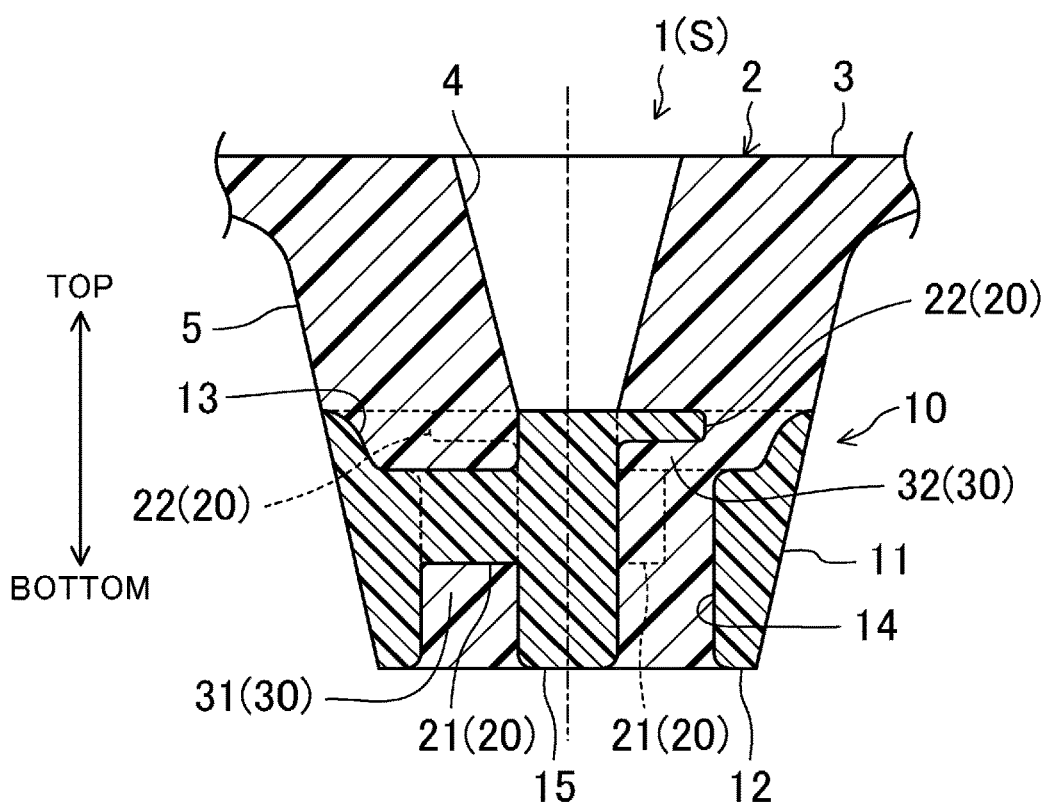
FIG. 10 corresponds to FIG. 9 and illustrates a configuration of a stud according to a first variation.

In the foregoing embodiment, the first locking portions 31 have a vertical thickness substantially equal to the vertical thickness of each of the second partition walls 22. However, this is merely a non-limiting example. For example, as in a first variation shown in FIG. 10, the first locking portions 31 may have a relatively large vertical thickness. Specifically, in this variation, the vertical distance between each of the ground contact portion 12 and the lower end portion of the core 15 and the lower end portions of the first partition walls 21 is longer than the vertical thickness of the second partition walls 22. Such a configuration can reduce degradation of the first locking portions 31 with time, such as the states where the first locking portions 31 are worn away due to abrasion at the time of touching the ground.

Second Variation of Embodiment

Figure 11:
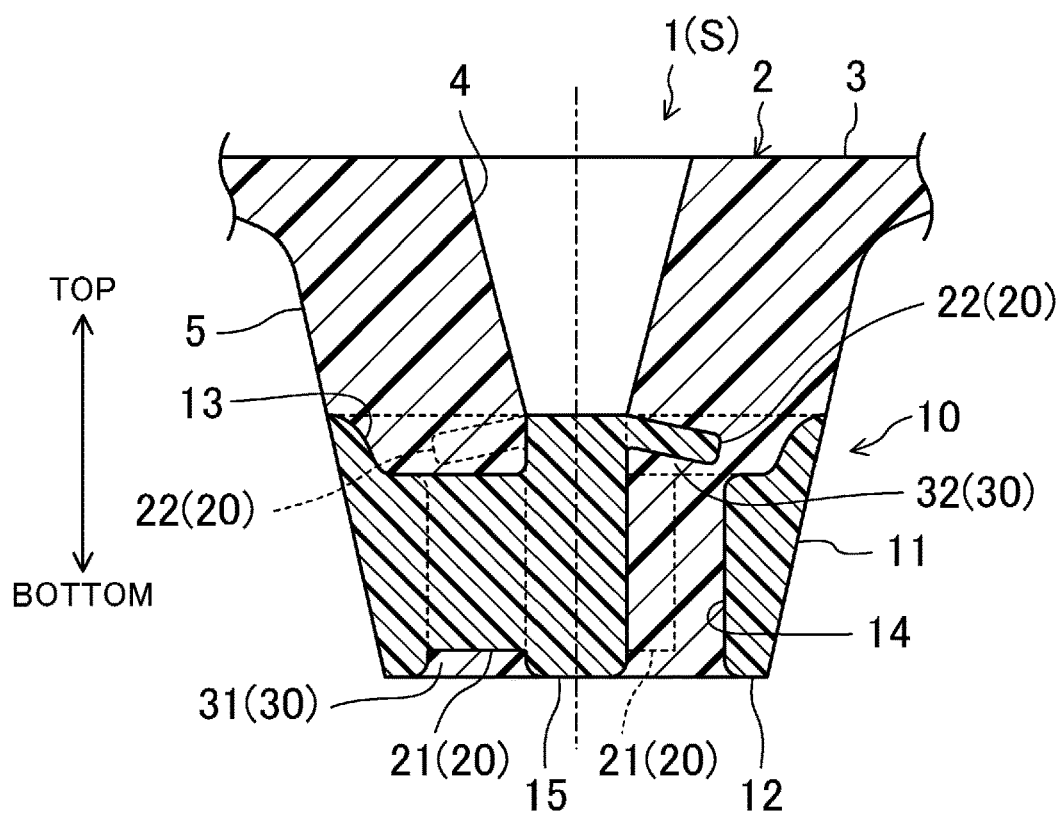
FIG. 11 corresponds to FIG. 9 and illustrates a configuration of a stud according to a second variation.

In the foregoing embodiment, the second partition walls 22 extend from the upper end portion of the core 15 in a direction orthogonal to the axial direction of the core 15 (i.e., in the radial direction of the tubular body 11). However, this is merely a non-limiting example. For example, as in a second variation shown in FIG. 11, the second partition walls 22 may extend in a direction inclined downward from the upper portion of the core 15. Specifically, in the second variation, the second partition walls 22 are inclined in a direction opposite to the direction in which when affected by an external force, the associated stud 10 is about to be separated from the outsole body 2. Such a configuration allows the second partition walls 22 to act like a barb on a fishing hook, for example, thus more firmly locking the second locking portions 32 to the second partition walls 22. This configuration can further reduce the separation of the studs 10 from the outsole body 2.

Third Variation of Embodiment

Figure 12:
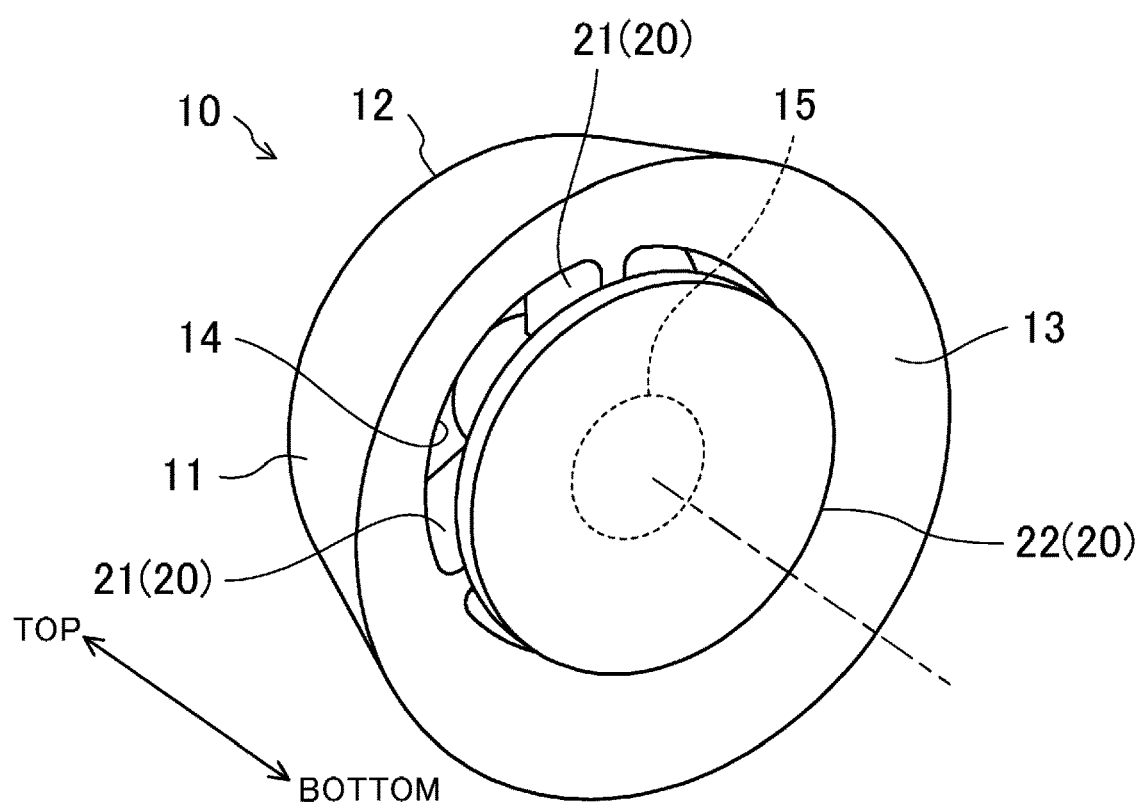
FIG. 12 corresponds to FIG. 8 and illustrates a configuration of a stud according to a third variation.

In the foregoing embodiment, the plurality of second partition walls 22 are provided. However, this is merely a non-limiting example. For example, as in a third variation shown in FIG. 12, only one second partition wall 22 may be provided. Specifically, in this variation, the second partition wall 22 has a substantially disk-like shape. Even in such a variation, the second locking portion 32 locked to the second partition wall 22 can reduce the separation of the associated stud 10 from the outsole body 2.

Fourth Variation of Embodiment

Figure 13:
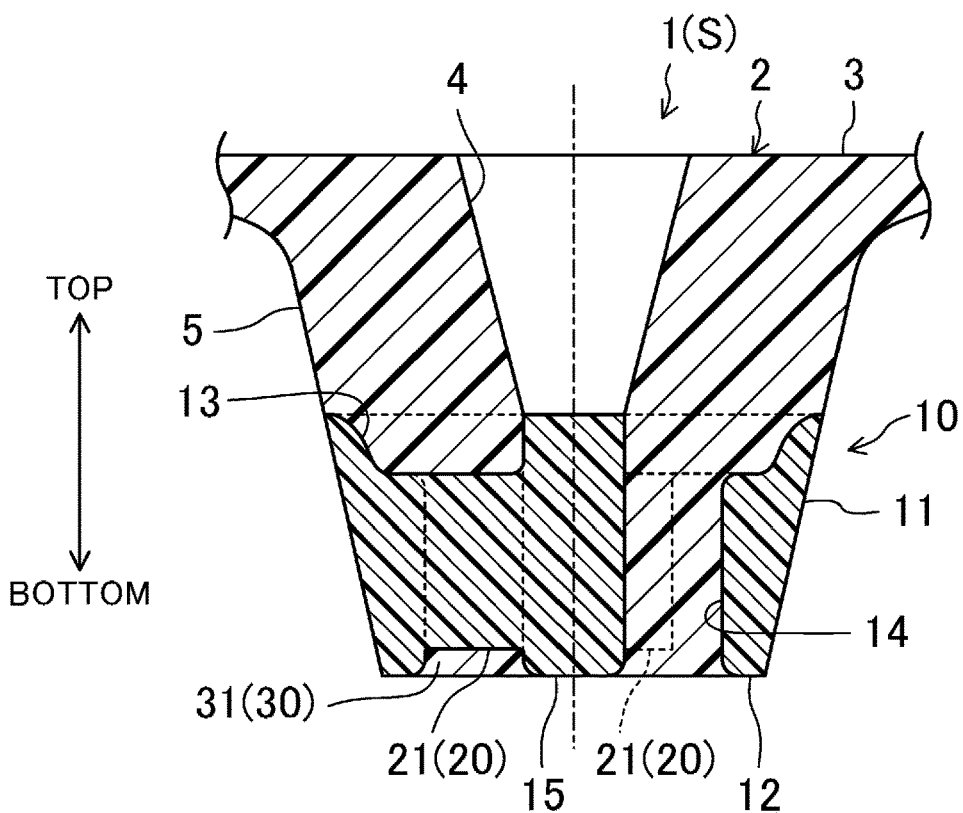
FIG. 13 corresponds to FIG. 9 and illustrates a configuration of a stud according to a fourth variation.

The partition walls 20 of each of the studs 10 according to the foregoing embodiment include the first partition walls 21, 21, . . . , and the second partition walls 22, 22, . . . . However, this is merely a non-limiting example. For example, like the studs 10 of a fourth variation shown in FIG. 13, only the first partition walls 21, 21, . . . , may be provided without providing the second partition walls 22, 22, . . . . Even in such a variation, the first locking portions 31 locked to the first partition walls 21 can reduce the separation of the associated stud 10 from the outsole body 2.

Fifth Variation of Embodiment

Figure 14:
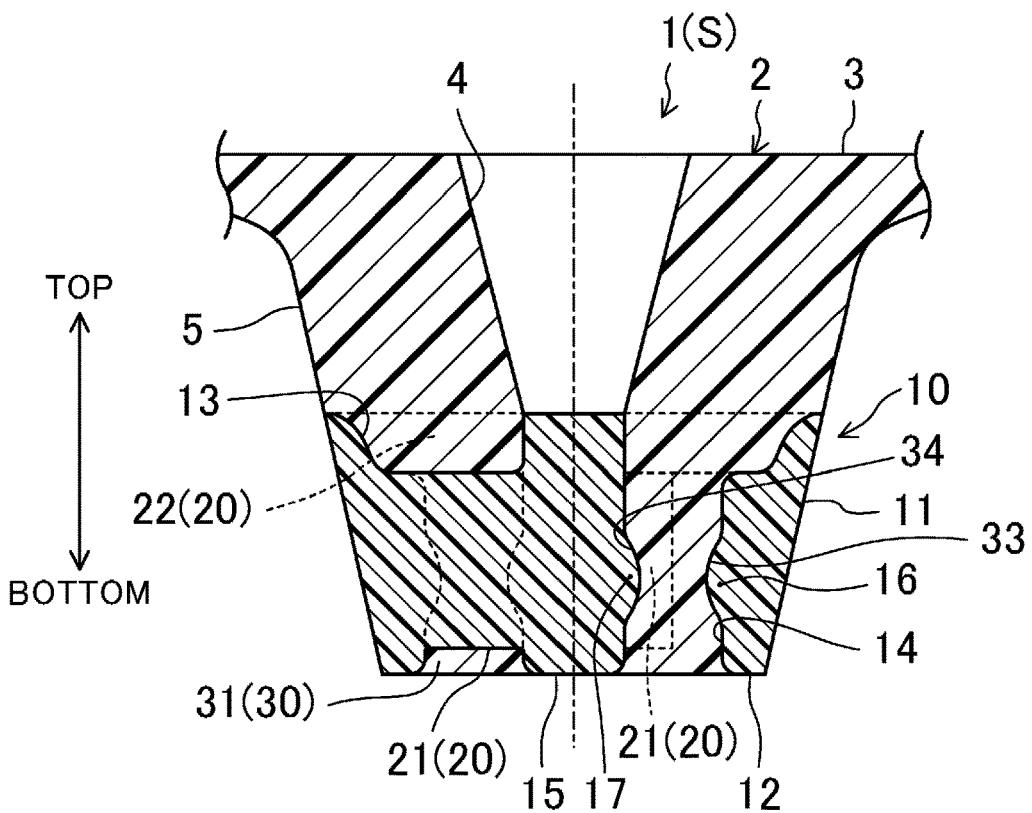
FIG. 14 corresponds to FIG. 9 and illustrates a configuration of a stud according to a fifth variation.

The hole 14 of each of the studs 10 according to the foregoing embodiment is formed such that the distance between the portions of the inner wall surface of the tubular body 11 in the radial direction is substantially constant. However, the distance does not have to be substantially constant. For example, as in a fifth variation shown in FIG. 14, the tubular body 11 may include a first bulging portion 16, and the outsole body 2 may include a first recess 33. Alternatively, the core 15 may include a second bulging portion 17, and the outsole body 2 may include a second recess 34.

The first bulging portion 16 is formed such that an intermediate portion of the inner wall surface of the tubular body 11 bulges radially inward (toward the core 15) from the inner wall surface. The first recess 33 is positioned to correspond to the first bulging portion 16 and is formed in the shape of a depression to conform to the outer shape of the first bulging portion 16. In other words, the first bulging portion 16 is fitted into the first recess 33. In this state, the studs 10 are held on the outsole body 2.

The second bulging portion 17 is formed such that an intermediate portion of the core 15 bulges radially outward (toward the inner wall surface of the tubular body 11) from the core 15. The second recess 34 is positioned to correspond to the second bulging portion 17 and is formed in the shape of a depression to conform to the outer shape of the second bulging portion 17. In other words, the second bulging portion 17 is fitted into the second recess 34. In this state, the studs 10 are held on the outsole body 2.

In this variation, the first and second bulging portions 16 and 17 respectively fitted into the first and second recesses 33 and 34 can further reduce the separation of the associated stud 10 from the outsole body 2, in combination with the locked state between the partition walls 20, 20, . . . , and the locking portions 30, 30, . . . .

The fifth variation shows an embodiment including both of the configurations: the configuration in which the first recess 33 is fitted to the first bulging portion 16; and the configuration in which the second recess 34 is fitted to the second bulging portion 17. However, this is merely a non-limiting example. In other words, the outsole structure 1 may be configured to include either the configuration in which the first recess 33 is fitted to the first bulging portion 16 or the configuration in which the second recess 34 is fitted to the second bulging portion 17.

Sixth Variation of Embodiment

Figure 15:
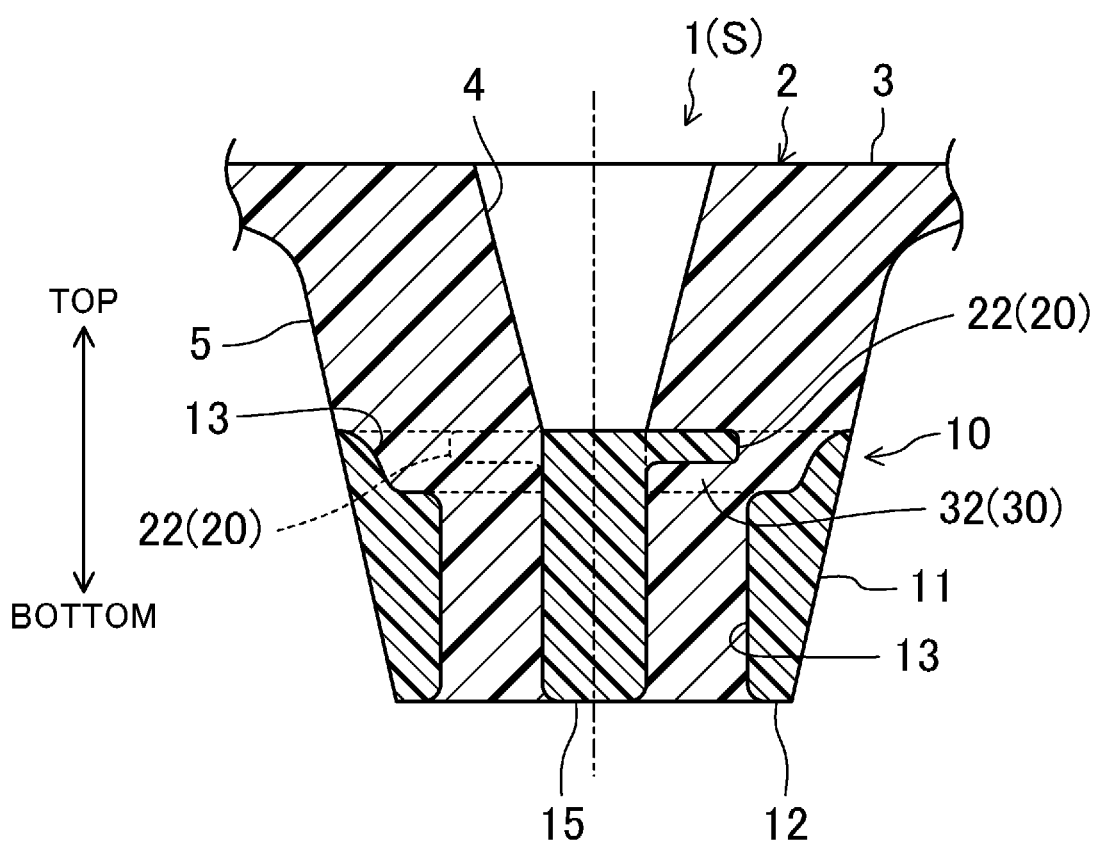
FIG. 15 corresponds to FIG. 9 and illustrates a configuration of a stud according to a sixth variation.

The partition walls 20 of each of the studs 10 according to the foregoing embodiment include the first partition walls 21, 21, . . . , and the second partition walls 22, 22, . . . . However, this is merely a non-limiting example. For example, just like the studs 10 of a sixth variation shown in FIG. 15, only the second partition walls 22, 22, . . . , may be provided without providing the first partition walls 21, 21, . . . . Even in such a variation, the second locking portions 32 of the outsole body 2 locked to the second partition walls 22 can reduce the separation of the associated stud 10 from the outsole body 2.

Other Embodiments

In the foregoing embodiment, the substantially cylindrical core 15 is shown. However, this is merely a non-limiting example. For example, the core 15 may have a polygonal shape, such as a triangular shape and a rectangular shape, as viewed in cross section.

In the foregoing embodiment, the plurality of first partition walls 21 are provided. However, this is merely a non-limiting example. In other words, a single first partition wall 21 may be provided.

Note that the present disclosure is not limited to the embodiment described above, and various changes and modifications may be made without departing from the scope of the present disclosure.

The present disclosure is industrially applicable as an outsole structure for shoes for use in sports requiring explosive actions, such as soccer, rugby, American football, and baseball, cleated shoes including the outsole structure, and a method for producing an outsole structure.

DESCRIPTION OF REFERENCE CHARACTERS

S Shoe
1 Outsole Structure
2 Outsole Body
10 Stud
11 Body
12 Ground Contact Portion
13 Upper Opening
14 Hole
15 Core
16 First Bulging Portion
17 Second Bulging Portion
20 Partition Wall
21 First Partition Wall
22 Second Partition Wall
30 Locking Portion
31 First Locking Portion
32 Second Locking Portion
33 First Recess
34 Second Recess

What is claimed is:

1. An outsole structure for a shoe, the outsole structure comprising:
   an outsole body; and
   a stud integrated with the outsole body,
   the stud including:
   a tubular body having a ground contact portion that comes into contact with ground, and a hole passing through the stud upward from the ground contact portion;
   a core disposed inside the hole and extending vertically; and
   a partition wall disposed above the ground contact portion and extending radially from the core toward an inner wall surface of the tubular body,
   the outsole body having a locking portion disposed below the partition wall,
   the locking portion being locked to the partition wall in a state in which an upper end portion of the locking portion is in contact with a lower end portion of the partition wall.

2. The outsole structure of claim 1, wherein
   the partition wall includes at least one first partition wall extending vertically,
   the at least one first partition wall is continuous with the core and the tubular body, and has a lower end portion positioned above the ground contact portion, and
   the locking portion includes at least one first locking portion having an upper end portion in contact with the lower end portion of the at least one first partition wall.

3. The outsole structure of claim 1, wherein
the partition wall includes at least one second partition wall disposed near an upper portion of the core and extending from the core in a direction intersecting with the core, and
the locking portion includes at least one second locking portion having an upper end portion in contact with a lower portion of the at least one second partition wall.

4. The outsole structure of claim 2, wherein
the at least one first partition wall includes a plurality of first partition walls,
the plurality of first partition walls are spaced apart from each other in a circumferential direction of the tubular body,
the partition wall includes at least one second partition wall disposed near an upper portion of the core and extending from the core in a direction intersecting with the core,
the locking portion includes at least one second locking portion having an upper end portion in contact with a lower portion of the at least one second partition wall, and
the at least one second partition wall is disposed between two of the at least one first partition walls adjacent to each other in the circumferential direction.

5. The outsole structure of claim 3, wherein
the at least one second partition wall extends in a direction inclined downward from the upper portion of the core.

6. The outsole structure of claim 1, wherein
the tubular body includes a first bulging portion formed such that an intermediate portion of an inner wall surface of the tubular body bulges toward the core, and
the outsole body has a first recess positioned to correspond to the first bulging portion and formed in a shape of a depression to conform to an outer shape of the first bulging portion.

7. The outsole structure of claim 1, wherein
the core includes a second bulging portion formed such that an intermediate portion of the core bulges toward an inner wall surface of the tubular body, and
the outsole body has a second recess positioned to correspond to the second bulging portion and formed in a shape of a depression to conform to an outer shape of the second bulging portion.

8. A cleated shoe comprising the outsole structure of claim 1.

9. A cleated shoe comprising the outsole structure of claim 2.

10. A cleated shoe comprising the outsole structure of claim 3.

11. A cleated shoe comprising the outsole structure of claim 4.

12. A cleated shoe comprising the outsole structure of claim 5.

13. A cleated shoe comprising the outsole structure of claim 6.

14. A cleated shoe comprising the outsole structure of claim 7.

15. A method for producing an outsole structure for a shoe, the method comprising:
integrating an outsole body and a stud together by injection molding, the stud including:
a tubular body having a ground contact portion that comes into contact with ground, and a hole passing through the stud upward from the ground contact portion;
a core disposed inside the hole and extending vertically; and
a partition wall disposed above the ground contact portion and extending radially from the core toward an inner wall surface of the tubular body,
the outsole body having a locking portion disposed below the partition wall,
the locking portion being locked to the partition wall in a state in which an upper end portion of the locking portion is in contact with a lower end portion of the partition wall.

* * * * *